June 5, 1956  W. S. JAMES  2,748,949
COMBINED FULL-FLOW AND PART-FLOW OIL FILTER
Filed Sept. 28, 1954
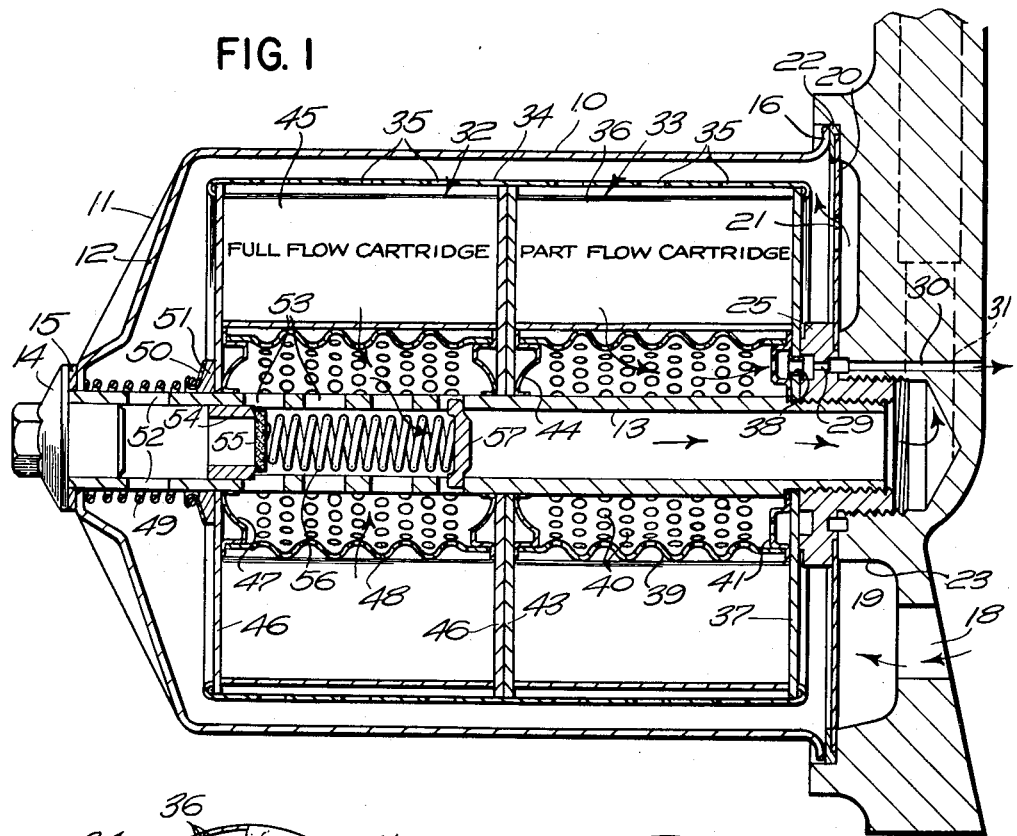
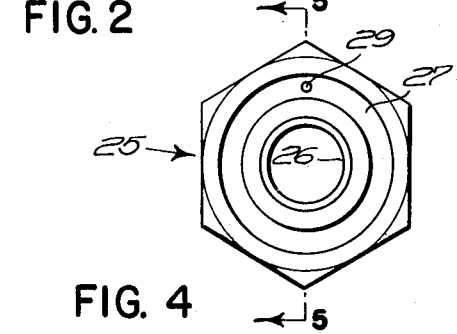
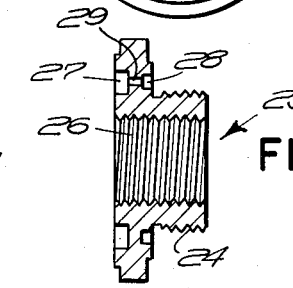
INVENTOR.
BY WILLIAM S. JAMES
Charles C. Wilson
ATTORNEY

United States Patent Office 2,748,949
Patented June 5, 1956

2,748,949

COMBINED FULL-FLOW AND PART-FLOW OIL FILTER

William S. James, Birmingham, Mich., assignor to Fram Corporation, Providence, R. I., a corporation of Rhode Island Application September 28, 1954, Serial No. 458,873

6 Claims. (Cl. 210—183)

This invention relates to an oil filter comprising an outer shell containing therein a full-flow filter cartridge and a part-flow filter cartridge arranged so that a major portion of the oil supplied to the shell will be subjected to a full-flow filtering operation while, at the same time, a small portion of the oil supplied to this shell will be subjected to a part-flow filtering operation.

When a new motor engine is finished and ready for operation, it is difficult to remove from such engine injurious "built-in" dirt such as sand and small metal particles; and if this "built-in" dirt is not removed from the engine, it may be carried by the oil stream to the engine bearings and seriously injure such bearings.

It has been proposed heretofore to prevent such "built-in" dirt from reaching the engine bearings by subjecting all the oil supplied to the bearings to a full-flow filtering operation; it has also been recommended that this be done for the first five hundred or thousand miles the motor vehicle is driven, and thereafter subject the oil for the engine bearings to a part-flow rather than a full-flow filtering operation. The difference between a full-flow filter and a part-flow filter is that the former will handle a relatively large stream of oil but will remove only the coarser dirt and foreign matter in the oil stream; whereas a part-flow filter will remove dirt and foreign matter down to an extremely small size, but will handle only a very small stream, unless the filter is made so large that it is not practical to install the same in a motor vehicle.

Full-flow and part-flow or by-pass filters have been used extensively heretofore, and it has been proposed to provide a filter shell that is adapted to receive either a full-flow cartridge or part-flow cartridge, one at a time. It has also been proposed heretofore to provide a filter shell having mounted therein to operate together a full-flow and part-flow cartridge, so that one will filter the major portion of the oil stream, while the other will filter a minor portion of the oil stream. Such major oil stream is delivered to the engine bearings and the minor oil stream is returned to the engine crankcase. The present invention, as above stated, contemplates the latter type of filter in which the two types of filter cartridges operate simultaneously in a filter shell.

When either a full-flow or part-flow filter is employed in a motor vehicle, it is extremely important that the filter be so constructed and installed that an ample supply of oil will at all times be delivered to the engine bearings, and that clogging of the filter cartridge will not prevent sufficient oil from reaching such bearings. It is equally important that this requirement be met when a combined full-flow and part-flow cartridge is used, as contemplated by the present invention.

Having in mind the foregoing, one important feature of the present invention resides in a simple and inexpensive oil filter comprising an outer shell having installed therein both a full-flow cartridge and a part-flow cartridge, and arranged so that the oil that passes through the full-flow cartridge will be supplied to the engine bearings and the oil which passes through the part-flow cartridge will be returned, through simple and direct connections, from this cartridge to the engine crankcase.

Another feature of the present invention resides in a replaceable cartridge housing having permanently secured therein a full-flow cartridge and part-flow cartridge, and arranged so that the mere placing of this unit in a filter shell and clamping the shell in place will make the proper oil flow connections for each cartridge.

Still another feature of the present invention resides in a simple type of by-pass valve mounted within the filter shell and which is designed to open when the full-flow filter cartridge becomes plugged with dirt to thereby insure delivery of a sufficient quantity of oil to the engine bearings.

The above and other features of the present invention will be further understood from the following description when read in connection with the accompanying drawing, wherein:

Fig. 1 is a longitudinal sectional view through a combined full-flow and part-flow oil filter constructed in accordance with the present invention.

Fig. 2, on a smaller scale, is an end view of Fig. 1, parts being broken away to show the construction of a pleated cartridge therein.

Fig. 3 is a top plan view of an apertured centering ring provided in the part-flow cartridge.

Fig. 4 is a top plan view of an adaptor nut to be described, and

Fig. 5 is a sectional view taken on line 5—5 of Fig. 4.

The oil filter illustrated in Fig. 1 of the drawing is shown as mounted directly upon a metal casting forming an integral portion of the internal combustion engine, and has its central axis extending in a horizontal direction. It will be understood, however, that this is not essential and the oil filter shown may, if desired, be constructed so that it may be mounted in spaced relation to such engine. It also can, with a slight change, be adapted to operate when its axis extends in a vertical or inclined direction.

Now referring to the drawing, the oil filter is shown as comprising a cup-shape shell 10 formed of sheet metal drawn to the shape shown. This shell has a rounded upper end 11 having formed therein the depressed strengthening ribs 12, and this upper end is provided with a central hole adapted to receive a center tube 13, which tube has welded or otherwise rigidly secured in its outer end the headed bolt 14 which has an outwardly extending flange adapted to engage a gasket 15 and hold the same in sealing engagement with the end 11 of the metal shell.

The shell 10 is shown as having at its inner end an outwardly extending annular flange 16 adapted to fit in an annular recess formed in the engine casting 17, to which casting the center tube 13 is threadedly secured in a manner to be described. The casting 17 is provided with an inlet port 18 adapted to receive oil from the usual oil pump, not shown, and the oil upon passing through the port 18 enters the annular recess 19 within the casting. The oil filter shown in Fig. 1 of the drawing is designed to be installed so that its central tube 13 extends in an approximately horizontal direction as shown. It is important that means be provided for preventing a large amount of the oil from draining out of the filter shell 10 when the engine is not running. This is accomplished in the construction shown by providing in the recess formed in the casting 17 for the inner end of the shell 10 an anti-flow disc 20 such as a metal disc having formed near the upper peripheral edge thereof an inlet oil passage 21. The arrangement is such that the oil supplied to the annular passage 19 will accumulate therein until it reaches a high enough level to pass through the hole 21 in the plate 20, so that when this oil passes into the shell 10 it cannot return by gravity to the engine pump and thereby empty the filter of oil. A gasket 22 is provided between the outer peripheral portion of the disc 20 and the portion 16 of the shell 10 to form a tight joint. The casting 17 is shown as having an annular boss 23 which is internally threaded to receive the threaded outer surface 24 of an adaptor nut 25. This nut is internally threaded as indicated by 26 to receive the threaded inner end of the center tube 13. This nut is also provided with an annular recess 27 formed in one face, and a second annular recess 28 formed in its other face, and extending between these two recesses is the small metering hole 29 which serves to determine the rate at which oil filtered by the part-flow cartridge, to be described, can escape from the filter casing and pass through a drilled hole 30 in the casting 17 back to the crankcase of the engine. The oil which enters the center tube 13 will travel therein in the direction indicated by the arrows to a passage 31 formed in the casting 17, to pass in an upward direction therein to the engine bearings to be lubricated. The nut 25 serves to provide a long threaded passage 26 adapted to receive a relatively long threaded portion of the center tube 13 to firmly support the same, and it also serves to provide the metering hole 29 above mentioned. The outer shell 10 is clamped tightly in the position in which it is shown by applying a wrench to the bolt 14 and rotating the tube 13 to screw this tube far enough into the nut 25 to exert a strong clamping pressure on the gaskets 15 and 22, and thereby tightly seal the casing 10.

The construction so far described is designed to receive a filtering unit comprising a full-flow filter cartridge 32 and a part-flow cartridge 33 which are both housed in the metal casing 34, which casing is provided with the holes 35 through which the oil in the shell 10 can pass into contact with the filter cartridges 32 and 33. This filter unit containing the two cartridges greatly simplifies the operation of removing oil cartridges and substituting new ones.

The two cartridges just mentioned are rather similar in appearance and the filtering element of each is formed of pleated paper which is arranged in the form of an annulus so that oil will be filtered as it passes inwardly through the walls of such annulus towards the center tube 13. It is important, however, that the pleated filter element 32 for the full-flow cartridge be formed of paper that has a much higher porosity than the paper which is used to form the part-flow filter element 33, so that oil will pass rapidly through the former and have the larger foreign particles removed therefrom, while oil will pass much more slowly through the filter element having a part-flow cartridge and have the foreign matter much more completely removed therefrom.

The part-flow filter cartridge 33 is shown as mounted close to the supporting casting 17 and this cartridge comprises a pleated filter sheet 36 formed of fairly thick porous paper, which is preferably treated with a resinous material such as phenol formaldehyde to increase its stiffness and its resistance to heated oil without seriously reducing its porosity. To one end of the plated annulus formed of the paper 36 is adhesively secured a disc 37, which may be formed of resin treated paper, and this disc lies close to the supporting casting 17 and is provided with an oil hole having mounted therein the grommet 38 that permits oil that has been filtered by the paper 36 to reach the above mentioned metering hole 29 and pass to the crankcase through the oil passage 30. The filter annulus formed of the paper 36 surrounds a corrugated metal core 39 which is provided with numerous holes 40 through which the oil that passes through the filter paper may enter the space between the interior of the core 39 and the outer surface of the center tube 13. The core 39 is centered with respect to the tube 13 by the positioning annulus or ring 41 that is held against the disc 37 by the core 39, and this centering ring is provided with a number of holes 42, as shown in Fig. 3, through which oil can pass from within the core 39 to the grommet 38. To the opposite end of the pleated annulus 36 is adhesively secured a disc 43 similar to the disc 37 except that it does not have the grommet discharge opening 38. Engaging the inner face of this disc 43 is a centering ring 44, like the ring 41 except that it is not provided with the holes 42. This ring 44 embraces the center tube 13 and fits within the core 39 to center the latter, and the ends of the core 39 abut against an annular flange upon the ring 41 and 44.

The second or full-flow cartridge 32 abuts against the part-flow cartridge 33, and both are mounted on the center tube 13 as shown so that the part-flow cartridge lies between it and the supporting base 17. The full-flow cartridge has a filtering element 45 formed of pleated porous paper which is preferably treated with a phenol formaldehyde resin to render it resistant to the hot oil and to increase its stiffness. This full-flow filter element 45 should be much more porous than the part-flow filter element 36 because the former must pass oil at a much higher rate than the latter. The filter element 45 has adhesively secured to each end thereof a fibrous disc 46, and abutting against the inner face of each disc is a centering ring 47 adapted to embrace the center tube 13 and center a corrugated core 48, similar to the core 39 of the part-flow cartridge 36.

The two cartridges 32 and 33 are housed within the casing 34, above described, and are secured therein so that one abuts the other. They are permanently secured in this housing by crimping the outer marginal edge of the housing inwardly to press against the outer faces of the discs 37 and 46, as shown. The housing 34 with the two cartridges secured therein forms an integral unit which is sold as such; and when the present oil filter is to be provided with such assembled cartridge unit, the center tube 13 is inserted through the aligned holes in the discs 37, 43, and 46 and screwed into the adaptor nut 25. It should be noted that the inner end of the tube 13 is reduced somewhat in diameter as shown to fit the smaller hole in the ring 41 rather than the larger holes in the other rings. The larger diameter of the major portion of the tube 16 will not enter the hole in the ring 41. Therefore, the cartridge assembly cannot be placed in the oil filter with the wrong end abutting against the nut 25. This is important for if the end disc 37 should be placed outwardly away from the supporting casting 17, the oil filtered by the cartridge 33 would not be directed into the return passage 30.

It is important that the cartridge assembly unit comprising the casing 34 and the cartridges therein be held yieldingly seated against the adaptor nut 25. This is accomplished by providing a coiled spring 49 which surrounds the tube 13 and one end abuts against the inner face of the head 11 while the other end engages the annular flange 50 that holds a gasket 51 in sealing engagement with the outer disc 46 of the full-flow cartridge.

Provision is made whereby a sufficient flow of oil will be delivered to the engine bearings even if the cartridges described should become so clogged with dirt that oil will not pass therethrough. To this end, the center tube 13 is provided with the holes 52 near its outer end through which oil may enter from the interior of the shell 10. This tube is also provided with the holes 53 positioned within the core 48. Snugly fitted within the bore of the tube 13 is a sleeve 54 which is pressed downwardly in this tube until it rests against an annular shoulder. The inner end of this sleeve is shaped as shown to form a valve seat against which a fibrous resin treated disc 55 is normally held seated by a coiled spring 56, the lower end of which spring rests upon a transversely extending pin 57 that is inserted through aligned holes in the tube 13.

Having described the various parts of the oil filter contemplated by the present invention, the manner in which the same operates will now be described. Oil, as above stated, is supplied by a pump, not shown, to the port 18 within the engine base 17 to pass through this port into the annular space 19 so that it will flow from this space through the hole 21 in the non-draining disc 20 to enter the shell 13 and surround the cartridges 32 and 33. The pressure under which the oil is forced into this shell will cause it to penetrate inwardly through the pleated walls of the cartridges 32 and 33, and, as above stated, the flow through the full-flow cartridge 32 will be much more rapid than through the part-flow cartridge 33. The oil that passes through the cartridge 32 will enter the center tube 13 through the holes 53 to pass lengthwise of this tube as indicated by the arrow, and then upward in the bore 31 to the engine bearings. The oil that penetrates through the pleated paper 36 of the part-flow cartridge will enter the space between the outer surface of the tube 13 and the cartridge 33 to escape from this space, at a slow rate determined by the size of the metering hole 29. It then enters the drill hole 30 and passes therethrough into the crankcase. The purpose in providing the adaptor nut 25 with the annular grooves 27 and 28 is to make it unnecessary to align the metering hole 29 with the discharge bore 30 or grommet 38 of the part-flow cartridge. Should the cartridges become clogged with dirt as a result of long use so that it is difficult for the oil to pass therethrough, the oil pressure will increase within the shell 10 until it forces downwardly the valve disc 55 and permits oil to by-pass the cartridges.

By employing a combined full-flow and part-flow cartridge where the two operate simultaneously within an oil filter, under normal conditions all oil supplied to the engine bearings will be filtered by the full-flow cartridge so that all but very fine dirt particles will be removed therefrom, and a small portion of the oil supplied to the casing 10 will be subjected to a much more thorough filtering operation by the part-flow cartridge 33 and then returned to the crankcase through the discharge bore 30. In such a construction, the so-called "built-in" engine dirt will be prevented from reaching the engine bearings, and the continuous fine filtering of part of the oil stream should keep the oil free of fine particles and of sludge or pasty refuse formed of dust, resin, carbon, and the like.

The cartridge unit formed of the housing 34 having the cartridges 32 and 33 permanently secured therein is so constructed that the operation of securing it in place in the filter shell 10 forms the proper oil connections for the stream of oil supplied to the engine bearings and also for the small stream of oil returned to the crankcase, and the location of the part-flow cartridge close to the engine casting makes possible the simple means shown for returning its oil to the crankcase.

Having thus described by invention, what I claim and desire to protect by Letters Patent is:

1. In oil filtering equipment of the type described, a replaceable cartridge housing constructed so that oil can freely enter the same and adapted to be inserted in and removed from an oil filter shell, and having permanently secured therein a full-flow cartridge and a part-flow cartridge disposed in axial alignment with each other and each having two end walls and a central tube-receiving space, and the part-flow cartridge having a central tube receiving opening in its end walls and having in its outside end wall a second opening spaced laterally from its center opening and through which oil that has been filtered by this cartridge can escape from this cartridge.

2. Oil filtering equipment as in claim 1, wherein both cartridges are of the outside-in flow type.

3. Oil filtering equipment as in claim 1, wherein each cartridge is formed largely of pleated porous paper.

4. A combined full-flow and part-flow oil filter comprising an oil confining shell and a supporting base for the shell, a discharge center tube extending from the base into the shell to discharge oil through said base, a full-flow cartridge mounted upon the tube in the shell in spaced relation to said base and a part-flow cartridge mounted upon the tube in the shell between the full-flow cartridge and base, means for introducing oil to be filtered into the shell about the cartridges, said part-flow cartridge having an end disc that sealingly embraces the tube adjacent the base and which disc has an aperture through which oil from the part-flow cartridge can pass, said tube being constructed to receive filtered oil from the full-flow cartridge but not from the part-flow cartridge, and the base having a discharge passage adapted to receive the oil from the part-flow cartridge that passes through said aperture.

5. A combined full-flow and part-flow oil filter as in claim 4 wherein each cartridge has an end disc that sealingly engages the center tube.

6. A combined full-flow and part-flow oil filter as in claim 4, wherein the part-flow cartridge has a fibrous end disc that rests upon and sealingly engages a central portion of said base.

References Cited in the file of this patent

UNITED STATES PATENTS

| 1,722,335 | Moorhouse | July 30, 1929 |
| 2,253,685 | Burckhalter | Aug. 26, 1941 |
| 2,253,686 | Burchkalter | Aug. 26, 1941 |
| 2,271,054 | Williams | Jan. 27, 1942 |
| 2,406,308 | Vokes et al. | Aug. 20, 1946 |
| 2,533,266 | Kovacs et al. | Dec. 12, 1950 |
| 2,562,361 | Kasten | July 31, 1951 |
| 2,598,322 | Vokes | May 27, 1952 |
| 2,680,520 | Beardsley | June 8, 1954 |

FOREIGN PATENTS

| 678,939 | Great Britain | Sept. 10, 1952 |